(12) United States Patent
Feher et al.

(10) Patent No.: US 8,620,878 B2
(45) Date of Patent: Dec. 31, 2013

(54) SYSTEM AND METHOD OF DISTRIBUTING MULTIMEDIA CONTENT

(75) Inventors: Gyula Feher, Budapest (HU); Fred Bradley Hunstable, Keller, TX (US); John Ham, Riverside, CA (US); Timothy G. Villanueva, Los Gatos, CA (US); Christopher Shen Yeh, Palo Alto, CA (US)

(73) Assignee: UStream, Inc., San Francisco, CA (US)

( * ) Notice: Subject to any disclaimer, the term of this patent is extended or adjusted under 35 U.S.C. 154(b) by 576 days.

(21) Appl. No.: 12/176,934

(22) Filed: Jul. 21, 2008
(Under 37 CFR 1.47)

(65) Prior Publication Data
US 2009/0100098 A1    Apr. 16, 2009

Related U.S. Application Data

(60) Provisional application No. 60/950,863, filed on Jul. 19, 2007.

(51) Int. Cl.
*G06F 7/00* (2006.01)
*G06F 17/00* (2006.01)

(52) U.S. Cl.
USPC ............ 707/692; 705/7.32; 705/14.44

(58) Field of Classification Search
USPC ................. 707/636, 821, 913, 692
See application file for complete search history.

(56) References Cited

U.S. PATENT DOCUMENTS

| | | | |
|---|---|---|---|
| 5,266,177 A * | 11/1993 | Watanabe et al. | 204/290.11 |
| 5,438,355 A | 8/1995 | Palmer | |
| 5,721,583 A | 2/1998 | Harada et al. | |
| 5,880,720 A | 3/1999 | Iwafune et al. | |
| 6,134,531 A * | 10/2000 | Trewitt et al. | 705/7.32 |
| 6,317,881 B1 * | 11/2001 | Shah-Nazaroff et al. | 725/24 |
| 6,585,521 B1 * | 7/2003 | Obrador | 434/236 |
| 7,036,083 B1 | 4/2006 | Zenith | |
| 7,103,903 B1 | 9/2006 | Kydd | |
| 7,143,177 B1 * | 11/2006 | Johnson et al. | 709/231 |
| 7,213,005 B2 | 5/2007 | Mourad et al. | |
| 7,225,233 B1 | 5/2007 | Fenton | |
| 7,225,455 B2 | 5/2007 | Bennington et al. | |
| 7,228,305 B1 | 6/2007 | Eyal et al. | |
| 7,228,560 B2 | 6/2007 | Panabaker | |
| 7,257,774 B2 * | 8/2007 | Denoue et al. | 715/719 |
| 7,340,765 B2 | 3/2008 | Feldmeier | |
| 7,707,170 B2 * | 4/2010 | Boggs | 707/602 |
| 7,734,762 B2 * | 6/2010 | Hundscheidt et al. | 709/224 |
| 7,739,140 B2 * | 6/2010 | Vinson et al. | 705/7.32 |
| 7,739,715 B2 * | 6/2010 | He et al. | 725/90 |
| 7,849,116 B2 * | 12/2010 | Jacobs et al. | 707/723 |
| 7,885,286 B2 * | 2/2011 | Sundqvist et al. | 370/432 |

(Continued)

OTHER PUBLICATIONS

Antwerpen et al., Energy-Aware System Design for Wireless Multimedia, Feb. 2004, IEEE, vol. 2, pp. 1-6.*

(Continued)

*Primary Examiner* — Wilson Lee
*Assistant Examiner* — Jessica N Le
(74) *Attorney, Agent, or Firm* — Fenwick & West LLP

(57) ABSTRACT

In accordance with one embodiment of the present invention, multimedia content may be streamed, together with associated timing information, to various users, who may provide feedback data in response to the multimedia content; the feedback data may be related to the multimedia content using the associated timing information, and then stored to some medium.

18 Claims, 2 Drawing Sheets

(56) References Cited

U.S. PATENT DOCUMENTS

| | | | |
|---|---|---|---|
| 7,885,962 B2* | 2/2011 | Barry et al. | 707/749 |
| 7,904,473 B2* | 3/2011 | Damick et al. | 707/781 |
| 7,908,559 B1* | 3/2011 | Denise | 715/738 |
| 2002/0046405 A1* | 4/2002 | Lahr | 725/87 |
| 2002/0053077 A1* | 5/2002 | Shah-Nazaroff et al. | 725/13 |
| 2002/0178441 A1* | 11/2002 | Hashimoto | 725/11 |
| 2003/0063125 A1* | 4/2003 | Miyajima et al. | 345/781 |
| 2003/0135605 A1* | 7/2003 | Pendakur | 709/224 |
| 2004/0103444 A1* | 5/2004 | Weinberg et al. | 725/132 |
| 2004/0181604 A1* | 9/2004 | Immonen | 709/232 |
| 2005/0145557 A1* | 7/2005 | Hamilton | 210/348 |
| 2005/0148296 A1* | 7/2005 | Kopra et al. | 455/3.01 |
| 2005/0154557 A1* | 7/2005 | Ebert | 702/182 |
| 2005/0204052 A1* | 9/2005 | Wang et al. | 709/231 |
| 2005/0229072 A1* | 10/2005 | Setton et al. | 714/748 |
| 2006/0014490 A1* | 1/2006 | Kopra et al. | 455/3.05 |
| 2006/0148296 A1* | 7/2006 | Zanella et al. | 439/310 |
| 2006/0156330 A1* | 7/2006 | Chiu | 725/24 |
| 2006/0253601 A1* | 11/2006 | Vedantham et al. | 709/231 |
| 2006/0282776 A1* | 12/2006 | Farmer et al. | 715/719 |
| 2007/0124756 A1* | 5/2007 | Covell et al. | 725/18 |
| 2007/0198939 A1* | 8/2007 | Gold | 715/757 |
| 2007/0206606 A1* | 9/2007 | Coleman et al. | 370/395.52 |
| 2007/0214471 A1* | 9/2007 | Rosenberg | 725/24 |
| 2007/0285438 A1* | 12/2007 | Kanowitz | 345/632 |
| 2007/0299935 A1* | 12/2007 | Plastina et al. | 709/219 |
| 2007/0300273 A1* | 12/2007 | Turner | 725/105 |
| 2008/0077956 A1* | 3/2008 | Morrison et al. | 725/38 |
| 2008/0086742 A1* | 4/2008 | Aldrey et al. | 725/24 |
| 2008/0196054 A1* | 8/2008 | Zarudyanskiy et al. | 725/20 |
| 2008/0201386 A1* | 8/2008 | Maharajh et al. | 707/201 |
| 2008/0229215 A1* | 9/2008 | Baron et al. | 715/751 |
| 2009/0006551 A1* | 1/2009 | Guday et al. | 709/204 |
| 2009/0320059 A1* | 12/2009 | Bolyukh | 725/32 |
| 2011/0167390 A1* | 7/2011 | Reed et al. | 715/854 |
| 2012/0203779 A1* | 8/2012 | Reisman | 707/732 |

OTHER PUBLICATIONS

"Interactive Television," Wikipedia®, Last modified Jan. 11, 2012, 5 pages, [Online] [Retrieved on Feb. 15, 2012] Retrieved from the Internet<URL:http://en.wikipedia.org/wiki/Interactive_television>.

* cited by examiner

SYSTEM AND METHOD OF DISTRIBUTING MULTIMEDIA CONTENT

BACKGROUND

1. Field of the Invention

Aspects of the present invention relate generally to capturing and storing the experience of a live event and reproducing that experience at a later date.

2. Description of Related Art

Currently, there exists no system that allows users to not only react to live multimedia content in real-time, but to have those reactions shared with the other users who are "participating" in the same live event—true, real-time interaction. The ability to share the experience of a live event with others, who may or may not be in the same physical space as any other user, greatly enhances both the users' and the broadcaster's experiences; the interactivity transforms the act of watching multimedia content from passive consumption to active participation. In addition, the information culled from the real-time reactions of the participating audience, when analyzed in the aggregate, can help to monetize and organize the associated multimedia content, and determine at what points in time within the multimedia stream the content is the most interesting and compelling.

Furthermore, there currently exists no mechanism by which the total experience of watching a live event, as interpreted and recorded by those participating in its consumption, can be reproduced at will and experienced in its entirety by users who did not participate in the original event.

So, while methods currently exist for streaming live multimedia content, they are inherently limited by the fact that they cannot take advantage of, in real-time, the audience's reaction and participation level. Thus, it is desirable to provide a system by which broadcasters and consumers of multimedia content can interact, in real-time, with the content and each other, and can see the reactions of the other users. It is also desirable to leverage the information gleaned by the reaction data provided by the users so as to enable discovery, in real-time, of content that users may find interesting; the aggregated information can also help advertisers and users determine the most compelling content within a particular stream. It is further desirable to enable the reproduction, at a later date, of the original multimedia stream together with the associated feedback data; such a facility enables a user to experience the event as if it were occurring live.

SUMMARY

In light of the foregoing, it is a general object of the present invention to provide a useful and novel way of synchronizing real-time interactivity with a live multimedia stream, such that the users' actions are mapped to specific time segments of the multimedia stream, thus allowing for aggregation of response data. The aggregated experience data can then be forwarded, in real-time, to the various users, thereby enabling them to feel as though they are a part of the virtual crowd (i.e., they can monitor how the audience, as a whole, is reacting, in real-time, to the multimedia stream they are all interacting with).

It is another object of the present invention to use the aggregated data to self-organize and monetize the associated multimedia content. By monitoring the various data being sent by the users, the system can determine various properties of the multimedia content (e.g., user engagement, topics being discussed, segments of particular interest, etc.) at very specific points in time, and can use that data to put the multimedia content into topical categories, determine the best time to display advertisements, auto-compile highlights, etc.

It is still another object of the present invention to make available, after the fact, the total "experience" of the original, live multimedia stream. This is accomplished by saving the original multimedia stream together with synchronized experience data sent by its users; because all of the data is synchronized, the original experience can be had again by simply re-streaming the multimedia content and presenting the stored experience data as it was originally created (i.e., at the correct point in time).

In accordance with one embodiment of the present invention, multimedia content may be streamed, together with associated timing information, to various users, who may provide feedback data in response to the multimedia content; the feedback data may be related to the multimedia content using the associated timing information, and then stored to some medium.

BRIEF DESCRIPTION OF THE DRAWING FIGURES

DETAILED DESCRIPTION

Aspects of the present invention are described below in the context of capturing and storing the experience of a live event and reproducing that experience at a later date. Throughout this description, reference is made to multimedia data and experience data. Multimedia data may generally comprise any data related to the multimedia content being streamed (the "multimedia stream") by a broadcaster; multimedia data may be implemented through and represented by various protocols and codecs (e.g., MPEG, MPEG-1 Audio Layer 3, Flash®, QuickTime®, etc.) and may be any combination of graphic images, audio, video, etc. Experience data may generally comprise real-time feedback data, related to the streaming multimedia data, as supplied by the various users interacting with the multimedia data; such data may take various forms including, but not limited to, numerical data, audio signals, etc.

Figure 1:
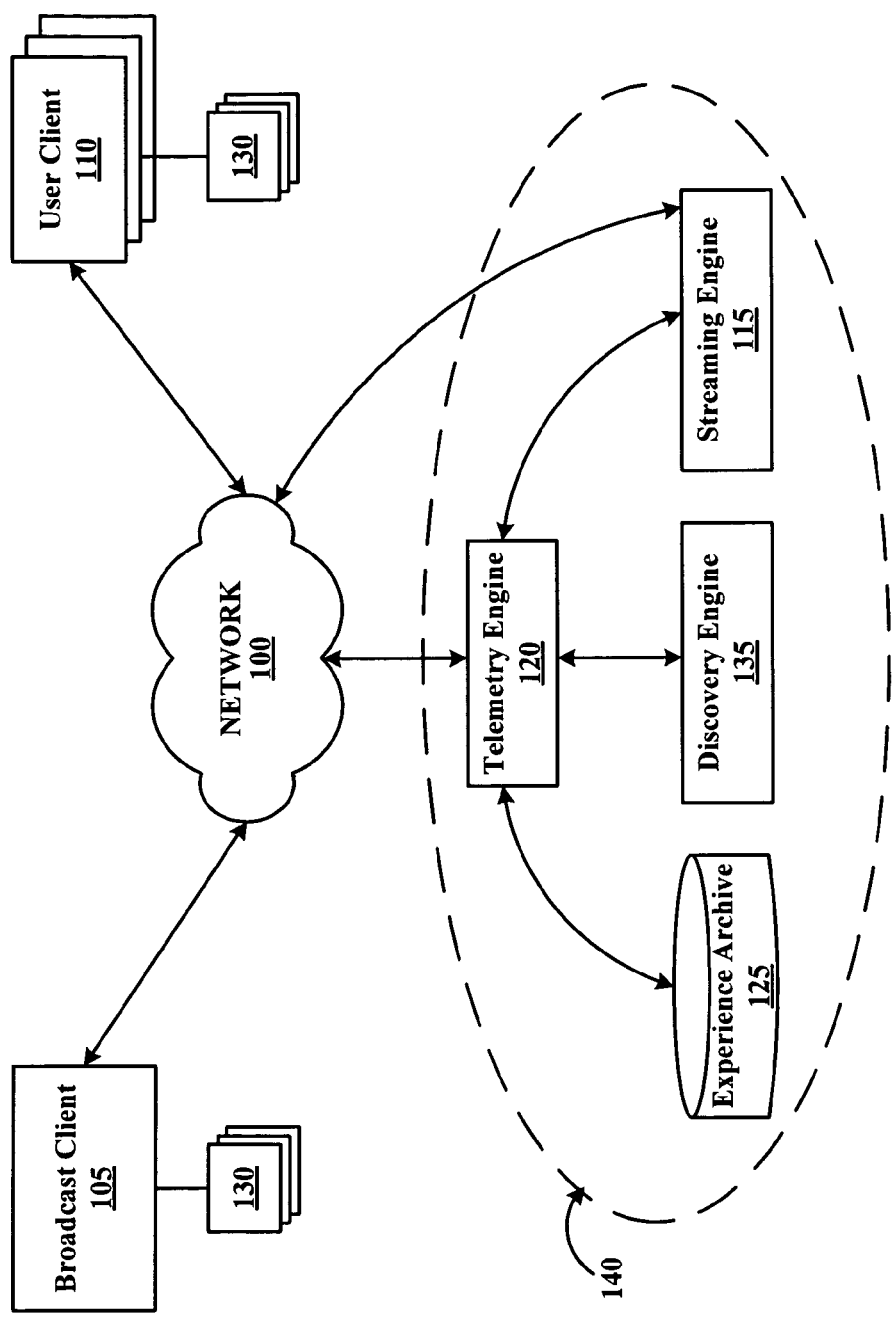
FIG. 1 is a simplified functional block diagram of the general architecture of an exemplary embodiment of a system for distributing multimedia content.

FIG. 1 is a functional block diagram of the general architecture of an exemplary embodiment of the present invention. Server 140 may generally comprise telemetry engine 120, experience archive 125, discovery engine 135, and streaming engine 115. It will be appreciated by those skilled in the art that the various elements that make up server 140 may exist together or apart in various combinations and permutations and do not necessarily need to be on the same physical machine. Elements of server 140, broadcast client 105, and user client 110, are on a network 100 (e.g., the Internet) and interface with each other through various protocols, such as, for example, the Hypertext Transfer Protocol (HTTP), the protocols used by Application Programming Interfaces (APIs) that may be provided by elements of server 140, etc.

Broadcast client 105 and user client 110 may be any application capable of interfacing with server 140, such as, for example, a web browser. Generally, user client 110 will be an end-user computer which is capable of receiving, among other things, the streaming multimedia data, and supporting tools (e.g., widgets) for interacting with it. Generally, broadcast client 105 may comprise, for example, a camera for capturing a live event, and a computer for relaying that event, over network 100, to telemetry engine 120.

Telemetry engine 120 integrates experience data received from, for example, experience widgets 130; it is a scalable process that manages the reception, aggregation, redistribution, and recording of real-time experience data provided by, for example, experience widgets 130, which may be embodied in, or generally comprise, software modules that run on both broadcast client 105 and user client 110. Experience widgets 130 allow both the broadcaster and the users to interact with the multimedia stream so as to simulate a wide variety of in-person, audience reactions, such as, for example, applause, boos, jeers, taunts, excited screams, etc. Experience widgets 130 report, in real-time, the experience data received by them, back to telemetry engine 120, where they are aggregated and then forwarded to all users as appropriate (i.e., aggregated data from a particular experience widget would not be forwarded to a user client 110 that was not running a particular experience widget).

The real-time experience data produced by the users, received by experience widgets 130, and aggregated by telemetry engine 120, are the various feedback data generated during a live broadcast, and can be thought of as "streams" of data that exist parallel to the multimedia stream. Examples of real-time experience data include chat streams (i.e., textual information entered by users through either a broadcast client 105 or a user client 110 as the video is being streamed), chat velocity (e.g., the overall frequency of the chat messages entered during a given time domain, or the frequency of a particular word or phrase at a given time or over a specified time domain, etc.), user information (e.g., number of users, average time users actually received a particular multimedia stream, aggregate amount of time users watched, or were engaged with, a particular multimedia stream, etc.), polling data (e.g., "do those shoes go with those pants?", "should we play a song off our first album?", etc.), audience approval data (as discussed in more detail below), etc.

One experience widget 130 that may have particular utility in certain implementations is a "shout meter" providing an indication of audience approval. A shout meter aims to simulate the roar of the crowd as it would usually occur if the users were actually there, in the presence of whatever is being displayed through the multimedia stream. A user can "shout" in any number of ways, and shouts can be aggregated with other user's shouts so as to provide the users (and advertisers) a sense of which multimedia stream segments the audience is most engaged. As a user "shouts," real-time feedback data may be provided, representative of both the user's shouting and the aggregate shouting of the other users. The more powerfully a user wants to shout, the more input he needs to provide to the shout meter. Similar to applause, other actions may be simulated as well, such as, for example, booing, heckling, cheering, etc.

In one embodiment, a shout meter may simply be an interface consisting of a graph, chart, etc., and a "button" used for clapping (and/or booing, etc.); if a user wanted to shout "loudly," he would rapidly click the button, and if he wanted to shout "softly," he might only press the button once or twice. In another embodiment, the shout meter may utilize the user's microphone or other peripheral device; in such a case, the user may clap (or boo, cheer, etc.) as he normally would, and experience widget 130 would send the action to the telemetry engine 120, either as a data structure(s) representative of the clap, or as the clapping sound itself (i.e., an audio signal), just as the microphone receives it. In the foregoing manner, when the aggregated experience data is returned to the various users in real-time, the now-combined audio signals may either inform a graph, chart, meter, etc. as to the overall applause, or may simply be routed to the users' speakers so that they may hear the actual crowd noise. Additionally, the meter itself (i.e., the mechanism by which users can observe a representation of their own shouts and/or the aggregated shouts of everyone else) may be implemented in a variety of ways, including as a "gravity" meter, which requires the user to constantly provide input in order to maintain weight in the aggregate.

The more accurately the experience data is synchronized with the multimedia content, the more effective and usable the experience data will be. To that end, telemetry engine 120 and experience widgets 130 can take into account various network operational characteristics (e.g., speed, latency, etc.) that uniquely influence or otherwise affect each user, by time-stamping the experience data with the time relative to the multimedia stream; telemetry engine 120 can then normalize the data, thereby compensating for the network operational characteristics. In one embodiment, the time-stamping is realized by having experience widgets 130 utilize "key frame" information (as defined by either telemetry engine 120 or streaming engine 115) together with the experience data being sent from experience widgets 130 to telemetry engine 120; synchronization of experience data with such a key frame at clients 105 and 110 may allow telemetry engine 120 to identify exactly where in the multimedia stream a user currently is so as to facilitate association of experience data with the portion of the multimedia stream the user intends.

In certain instances, where a "key frame" synchronization approach is not feasible or economical, telemetry engine 120 may implement a server-based timestamp solution, which may provide reasonable accuracy, but may require compensation strategies to account for deleterious network effects. For example, if latency is not accounted for, as in a server-based timestamp approach, then it may be the case that a user's experience data is "off" with respect to the multimedia stream for a period equal to, or greater than, the latency (i.e., the experience data may not be synchronized with exactly what the user intended).

Using the experience data enabled and provided by experience widgets 130, telemetry engine 120 can dynamically categorize live multimedia streams. Consider the example of a broadcaster hosting a talk show. Without the ability to categorize the show in real-time, it may initially exist in only a single category (e.g., "talk show," etc.). However, by using the experience data, telemetry engine 120 can deduce (e.g., from chat stream text parsing, etc.) that certain topics are being discussed and, based on this topical information, can assign the show to various other categories (e.g., cars, watches, etc) as appropriate. Further, it may be the case that a multimedia stream belongs to certain categories only at certain points in the stream. For example, the talk show host may discuss cars in the first half of the show, but make no mention of them in the second half. In that case, the show may be put in the "car" category only for the first half. The ability to dynamically assign categories to certain parts of a multimedia stream may enable future users to go directly to the content they are interested in and not have to sift through the entire multimedia stream to find it. In one embodiment, telemetry engine 120 may simply parse the parallel chat stream to realize the topics being covered. In another embodiment, the broadcaster may make available an experience widget that contains tags describing or otherwise categorizing the stream; the tags can be selected by users of the stream. In addition, an option may exist for users to create their own tags and apply them to different points in the show. It may be the case that the tags themselves are the categories, or they may simply inform the categorization decision.

To allow for the re-experiencing of a live multimedia stream, the data integrated by telemetry engine 120 may be stored to experience archive 125, which is the synchronized storage of recorded elements of the interactive experience, and allows for the reproduction, at a time after the live event, of the live experience in the same interactive form as was present during the original live stream. In addition to the reproduction of the experience, a user attending the event as it is being replayed may also participate in those experience widgets 130 that were available during the live stream; similar to video-editing software, the user can "dub" additional data back into the original experience.

The additional data provided by a user as he is experiencing an event after it has already been streamed live can be associated with the event in experience archive 125 in various ways. In one implementation, the additional data may be added to the information corresponding to the event and previously stored to experience archive 125 so that a user who experiences the event going forward sees the original data and the additional data (either inline with the original data or distinguished from it). In another implementation, the additional data may be sectioned off from the information originally stored to experience archive 125 and seen only if requested by a future user (e.g., the user may request to see the additional data that was added in the last 10 days, etc.).

In light of the all-encompassing way in which events are stored in experience archive 125, broadcasters—those people or companies that stream events—can exploit the rich analytics associated with their event as provided by telemetry engine 120. For example, a comic may use experience archive 125 to experience, as a member of the audience, a set he performed; he may pay close attention to the experience data provided by the audience (e.g., boos, laughter, applause, comments, etc.) to fine-tune future performances. As another example, advertisers may wish to examine a recorded event to determine which multimedia streams, and where in those streams, advertisements may be most effective.

The system may also contain a discovery engine 135, which users can use to find content that may interest them. Discovery engine 135 identifies, in real-time, those shows that are deemed interesting and compelling based on audience reactions as relayed through the experience data aggregated by telemetry engine 120. Discovery engine 135 can identify patterns, and deviations from those patterns, within the experience data, and deduce from those findings certain useful information about the multimedia streams. For example, discovery engine 120 may provide a search mechanism that allows users to search for particular content (e.g., accessed by most users, most highly rated, topic, etc.). As another example, discovery engine 135 may be used to generate program guides, through which various programs may be displayed and sorted according to various criteria. As yet another example, discovery engine 135 may generate syndication feeds using, for example, any of a number of Extensible Markup Language (XML)-based formats (e.g., Rich Site Summary (RSS), Atom, etc.), etc. These feeds may be routinely updated as discovery engine 135 has new data to work with, and these updates will be syndicated to users subscribed to the various feeds. Similarly, discovery engine 135 may provide alerts/updates to users, signaling that new multimedia content is available that they may be interested in; the alerts/updates can be sent through e-mail, instant message, etc.

Finally, a streaming engine 115 may be utilized to enable a one-to-many broadcast of the multimedia stream. Streaming engine 115 may use any number of technologies to deliver the multimedia content to user clients 110, such as, for example, Content Delivery Networks (CDNs), Peer-to-Peer (P2P) systems, etc. The present disclosure is not intended to be limited to any particular streaming technology or communication protocol implemented by streaming engine 115.

Figure 2:
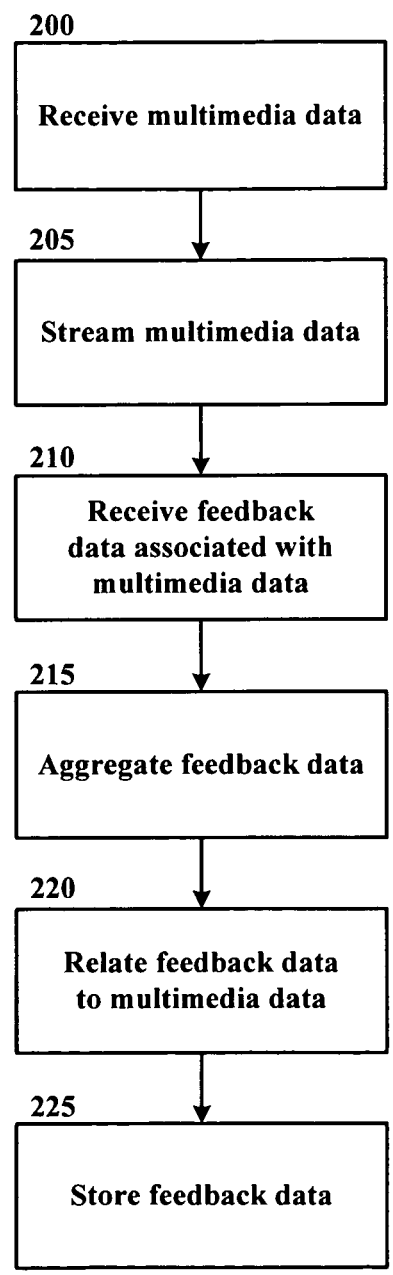
FIG. 2 is a logical flowchart of the general process by which multimedia content may be distributed.

FIG. 2 is a logical flowchart of the general process by which multimedia content may be distributed. As discussed, the invention seeks to record, and make reproducible, the experience of a live event as delivered via a multimedia stream. The multimedia content may be provided by a broadcast client 105, which may comprise something as simple as a webcam connected to a computer. As indicated at block 200, this multimedia content may be received by, for example, a server or system of servers configured to distribute the multimedia data. In some embodiments, such a server may comprise a telemetry engine such as set forth above. Together with the multimedia content to be streamed, the broadcaster may also specify certain experience widgets to be used by the eventual users of the stream. For example, the broadcaster may wish for the users to leave comments through an experience widget related to chat, or to constantly rate the broadcast on a scale of 1 to 10 through an experience widget related to polling, etc. In addition to the experience widgets the broadcaster may desire, certain widgets may be required by the proprietors of, for example, the telemetry engine (e.g., they may require a "pulse meter" to always be displayed, or for chat to always be available, etc.).

At block 205, the multimedia content is streamed together with associated timing information. As discussed above, the multimedia content may be streamed in any number of ways, including P2P, CDN, etc., and may or may not require a dedicated streaming engine and/or server(s), depending on the number of users, the quality of the video, or a combination of these and other factors.

The associated timing information may be any information that is used to help synchronize the experience data with the multimedia stream, including, but not limited to, the "key frame" solution described above. Such associated timing information may facilitate the mapping of experience data to points in the multimedia stream.

The multimedia stream and associated timing information are received by the experience widgets running on the user clients. The experience widgets are aware of, and understand, the timing information, and use it to synchronize with the multimedia stream the experience data generated each time a user takes some action on a widget. For example, if the multimedia stream is presented along with a shout meter widget used to measure "shouts," then each time the user shouts, that action is recorded together with the timing information so as to note that the shout took place at a certain point in the multimedia stream.

The experience data is received (e.g., by the telemetry engine) as indicated at block 210. The experience data includes not only the actions taken by the user, and through what experience widget, but also information specifying the point in the multimedia stream that those actions took place.

The telemetry engine may be receiving experience data from a plurality of users as the multimedia stream plays, and may be aggregating, in real-time, this data as indicated at block 215. At block 220, the telemetry engine may use the experience data (and its included associated timing information) to determine what multimedia stream the experience data belongs to, which experience widget provided the data, and at what point within the stream the data corresponds. As the experience data is culled, the telemetry engine can develop metrics that describe the activity of the used widgets on an audience-wide scale; this information can then be forwarded to all of the users and displayed by the respective experience widgets so as to give the users an idea of the overall, real-time, crowd reaction, participation, excitement, emotion, etc.

Finally, as indicated at block 225, all or a selected portion of the experience data aggregated and parsed by the telemetry engine may be stored in some manner, such as, for example, to an experience archive. Because the multimedia stream can be stored along with the synchronized experience data, it may be reproduced in the future in exactly the same form as it was originally presented. As explained above, this may enable a future user to look in on the experience or interact with it as if it were happening live (i.e., the same experience widgets will be available to the user as were available to those who experienced it live).

The sequence and numbering of blocks depicted in FIG. 2 is not intended to imply an order of operations to the exclusion of other possibilities. It will be appreciated by those of skill in the art that the foregoing systems and methods are susceptible of various modifications and alterations. For example, it may not be the case that the storing of an experience to an experience archive happens only after the multimedia stream is complete; the experience data may be stored to the experience archive in real-time, at block 220, as the telemetry engine sifts through it.

Several features and aspects of the present invention have been illustrated and described in detail with reference to particular embodiments by way of example only, and not by way of limitation. Those of skill in the art will appreciate that alternative implementations and various modifications to the disclosed embodiments are within the scope and contemplation of the present disclosure.

What is claimed is:

1. A method of distributing broadcasting multimedia content, the method comprising:
   receiving multimedia data to be distributed;
   streaming, by a computing device at a first time, a first presentation of the multimedia data to first users, wherein the multimedia data is presented to each of the first users for a duration of time in a time-dependent manner;
   responsive to streaming the first presentation, receiving a plurality of items of experience data from the first users, each item of experience data associated with a point of time in the multimedia data, and the each item of experience data representing a reaction by one of the first users at the associated point of time during the first presentation of the multimedia data;
   aggregating, by a telemetry engine, the items of experience data corresponding to the multimedia data to generate aggregated experience data;
   analyzing the aggregated experience data;
   assigning at least a portion of the multimedia data to one or more categories based on the analysis of the aggregated experience data;
   sending the aggregated experience data to the first users for presentation to the users in conjunction with the first presentation of the multimedia data;
   storing the aggregated experience data in association with the multimedia data;
   at a second time after the first time, streaming a second presentation of the multimedia data to second users; and
   sending the aggregated experience data to the second users for presentation to the second users in conjunction with the second presentation of the multimedia data.

2. The method of claim 1, wherein the experience data comprises at least one of textual messages, polling data and audience approval data.

3. The method of claim 2, wherein analyzing the experience data comprises parsing the textual messages to extract a topic of the multimedia data.

4. The method of claim 1, wherein the assigning of the portion of the multimedia data is performed while the multimedia data are being streamed to the first users.

5. The method of claim 1, further comprising:
   receiving one or more tags for categorizing the multimedia data from the first users, wherein the multimedia data is assigned to the one or more categories based on the received tags.

6. The method of claim 1, further comprising synchronizing the aggregated experience data or a portion of the aggregated experience data with the multimedia data.

7. The method of claim 1, further comprising:
   responsive to streaming the second presentation, receiving an additional item of experience data from one of the second users, the additional item of experience data associated with a point of time in the multimedia data, and the additional item of experience data representing a reaction by the second user at the associated point of time during the second presentation of the multimedia data; and
   storing the additional item of experience data in association with the multimedia data.

8. The method of claim 7, wherein storing the additional item of experience data comprises combining the additional item of experience data with the aggregated experience data.

9. The method of claim 7, wherein storing the additional item of experience data comprises storing the additional item of experience data separately from the aggregated experience data.

10. A system for distributing broadcasting multimedia content, the system comprising:
    a streaming engine comprising a processor, the streaming engine configured to:
       at a first time, stream a first presentation of multimedia data to first users, wherein the multimedia data is presented to the first users for a duration of time in a time-dependent manner; and
       at a second time after the first time, stream a second presentation of the multimedia data to second users; and
    a telemetry engine configured to:
       receive a plurality of items of experience data from the first users responsive to streaming the first presentation of the multimedia data to the first users, each item of experience data associated with a point of time of the multimedia data, and the each item of experience data representing a reaction by one of the first users at the associated point of time during the first presentation of the multimedia data;
       aggregate the items of experience data corresponding to the multimedia data to generate aggregated experience data;
       analyze the aggregated experience data;
       assign at least a portion of the multimedia data to one or more categories based on the analysis of the aggregated experience data;
       send the aggregated experience data to the first users to be presented to the first users in conjunction with the first presentation of the multimedia data;
       store the aggregated experience data in association with the multimedia data; and
       send the aggregated experience data to the second users to be presented to the second users in conjunction with the second presentation of the multimedia data.

11. The system of claim 10, wherein the experience data comprises at least one of textual messages, polling data and audience approval data.

12. The system of claim 11, wherein the telemetry engine analyzes the experience data by parsing the textual messages to extract a topic of the multimedia data.

13. The system of claim 10, wherein the telemetry engine is configured to assign the portion of the multimedia data while the streaming engine streams the multimedia data to the first users.

14. The system of claim 10, wherein the telemetry engine is further configured to receive one or more tags for categorizing the multimedia data from the first users, wherein the multimedia data is assigned to the one or more categories based on the received tags.

15. The system of claim 10, further comprising a discovery engine configured to find multimedia data based on the aggregated experience data.

16. The system of claim 10, wherein the telemetry engine is further configured to:

responsive to streaming the second presentation, receive an additional item of experience data from one of the second users, the additional item of experience data associated with a point of time in the multimedia data, and the additional item of experience data representing a reaction by the second user at the associated point of time during the second presentation of the multimedia data; and store the additional item of experience data in association with the multimedia data.

17. The system of claim 16, wherein storing the additional item of experience data comprises combining the additional item of experience data with the aggregated experience data.

18. The system of claim 16, wherein storing the additional item of experience data comprises storing the additional item of experience data separately from the aggregated experience data.

* * * * *